Sept. 11, 1934. H. KÜPPENBENDER ET AL 1,973,213
PHOTOGRAPHIC CAMERA WITH FINDER
Filed Feb. 27, 1932 3 Sheets-Sheet 1
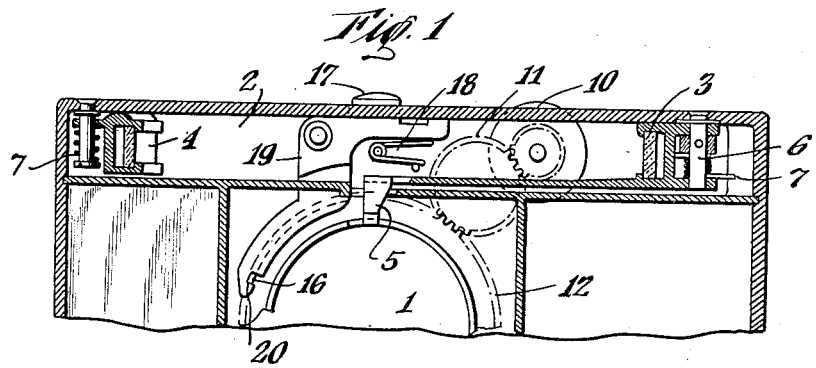
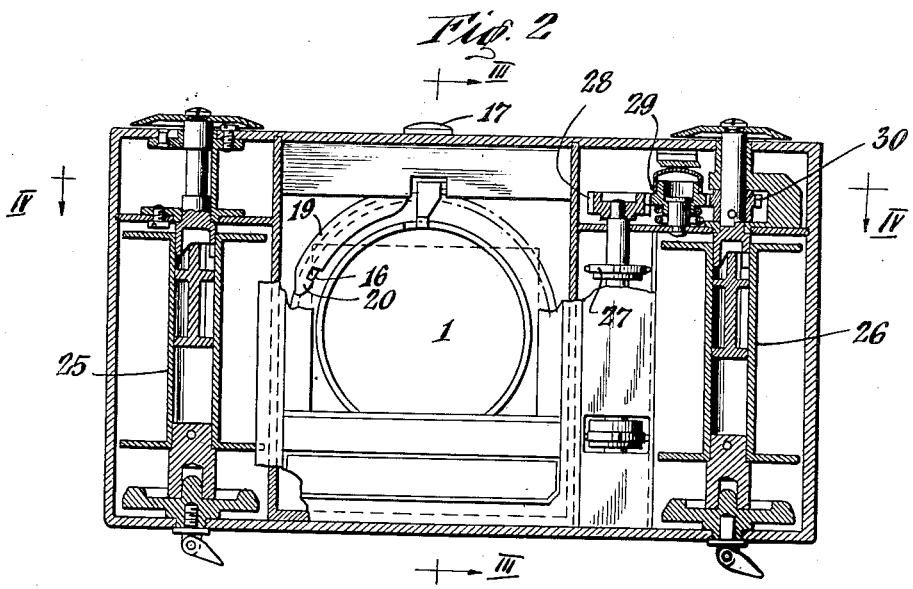
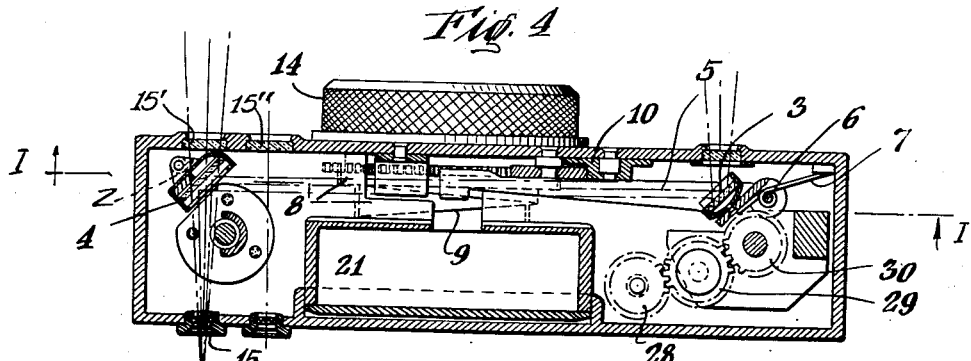

Sept. 11, 1934.   H. KÜPPENBENDER ET AL   1,973,213
PHOTOGRAPHIC CAMERA WITH FINDER
Filed Feb. 27, 1932   3 Sheets-Sheet 2
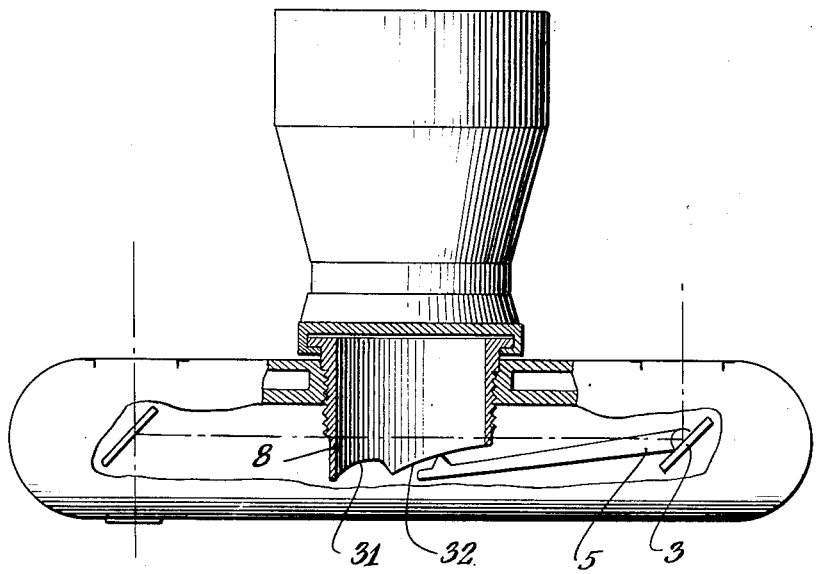
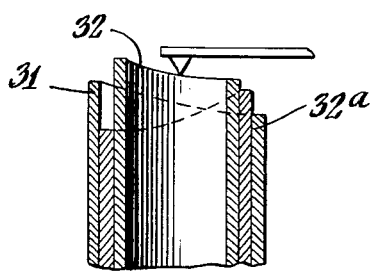
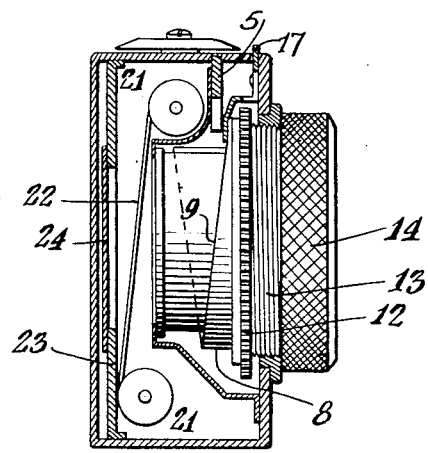
INVENTORS
Heinz Küppenbender
Martin Nowicki
Emanuel Goldberg
Arthur Mende
ATTORNEY

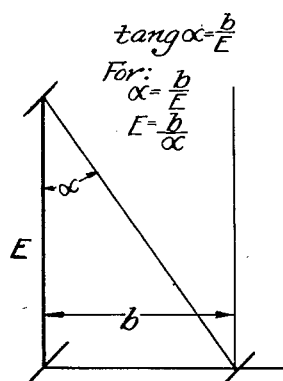
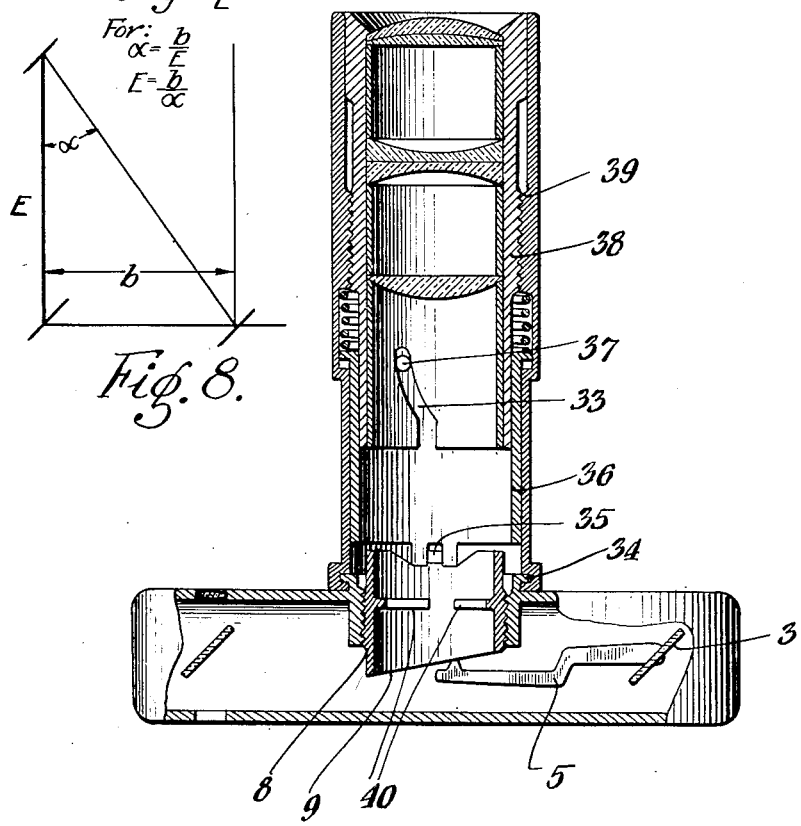

Patented Sept. 11, 1934

1,973,213

UNITED STATES PATENT OFFICE 1,973,213

PHOTOGRAPHIC CAMERA WITH FINDER

Heinz Küppenbender, Martin Nowicki, Emanuel Goldberg, and Arthur Mende, Dresden, Germany Application February 27, 1932, Serial No. 595,508
In Germany April 11, 1931

7 Claims. (Cl. 95—44)

This invention relates to improvements in film-cameras in which a base distance or range finder for measuring short distances is coupled to the frame for the objective which is displaceable by means of a worm gear compelling the objective to participate in the adjustment of the finder until the desired focus has been obtained.

In order to produce an accurate focusing of the objective by the finder, the same must be so coupled with the means for adjusting the objective that idle motion is avoided.

In order to obtain this result according to our invention, the regulator curve governing the finder is firmly connected with the stem carrying the objective adjustment so that the curve is located concentrically to said stem.

The objective frame is connected to the stem by means of a bayonet lock or telescopically arranged for allowing its extension to any desired focal distance.

For adjustment to short focal distances in the latter case the objective frame is displaced together with the stem carrying the frame.

According to our invention the finder is so coupled with the means for adjusting the objective that it can readily be arranged in a compartment above the optical system of the camera, said compartment readily fitting the sectional formation of the camera housing.

The compartment for the finder is separated from the picture taking compartment by means of a partition wall and is located in the upper part of the camera housing in its position of use.

As the finder is located in the immediate vicinity of the objective a coupling of the same with the finder can readily be effected without the necessity of using complicated transmission elements allowing an exact focusing.

According to our invention the adjustment of objective and finder is effected in a simple manner by the arrangement of a gear upon the objective stem provided with a worm gear and by gearing this gear with a regulator disc. This disc is preferably provided at the front wall of the camera in such manner that the disc is projecting beyond the upper margin of the camera.

This regulating disc can also be arranged on the outside of the camera or within the same in which case it projects through the camera top, it may also be coupled or connected with the objective stem by the intermediary of intermediate gears.

The extreme focal adjustment is limited by means of a suitable stop which according to our invention is arranged within the stem of the objective and is kept in place by means of a spring controlled angular lever projecting through the top of the camera.

The stop is released by a pressure upon a knob of the angular lever and the objective and finder can then be regulated by the simple rotation of the regulator disc.

With the above described construction the regulating curve for the finder must be selected to suit the focal distance of the objective used in the camera, and for this reason objectives having other focal distances could not be used without changes in the construction.

In order to use our device with objectives for varying focal distances the regulating curve is either arranged on the optical system so that the entire device may be exchanged, or a plurality of such regulator curves may be arranged on the adjustable parts of the optical system with which the finder is coupled.

Another modification of our invention allows the coupling of the finder with objectives for varying focal distances by arranging the regulator lever for the finder slidably upon a suitably selected curve permanently in arrangement therewith and to bring the measured distance in correspondence with the distance adjustment of the objective for the single focal distances by arranging an additional curve in the camera or on the frame for the objective.

These and other objects and advantages of our invention will become more fully apparent as the description thereof proceeds, and will then be more specifically defined in the appended claims.

In the accompanying drawings forming a material part of this disclosure:

Fig. 1 is a fragmentary, inner front elevation of a camera constructed according to our invention, in section along line I—I of Figure 4.

Fig. 2 is a longitudinal section through the camera on line II—II of Figure 3.

Fig. 3 is a cross-section on line III—III of Figure 2.

Fig. 4 is a section on line IV—IV of Figure 2.

Figures 5 and 6 are fragmentary sectional elevations of modified forms of our device.

Figure 7 is a longitudinal sectional elevation of a further modification of our invention.

Figure 8 is a diagram of the curve calculation.

As illustrated, in Figures 1 to 4, the camera 1 carries a compartment 2 for the finder. The finder comprises a wholly silvered mirror 3 and a mirror 4 half-pervious to light oppositely arranged in said compartment, and if the sight is taken behind the mirror 4, it will be possible to view simultaneously the picture directly and also as appearing in the mirror 3. Both pictures must be brought into perfect alignment by suitable rotation of one of the mirrors, and this is brought about by suitably adjusting the objective frame or the regulator curve of the finder connected thereto. The back of mirror 4 being half pervious to light will not obstruct the vision on a direct line through eye piece 15 in certain positions and in others the second eye piece to the right of eye piece 15 will permit observation.

The mirror 3 is movably arranged about a pin or stub shaft 6 at the outer end of a lever 5, which is pressed by means of a spring 7 against the regulator curve 9 which is fixedly arranged upon the stem 8 of the objective.

The adjustment of the objective and the finder is effected by means of the regulator disc 10 which is connected with the frame 14 of the objective by the intermediary of the gear 11 meshing with the gear 12 on the threaded part 13, by means of which the objective is adjustable in axial direction.

During the adjustment the sight is taken from behind the observation openings 15 and through the flat glass-plates 15' and 15'' in the openings in the front of the camera.

The movement of the objective into its extreme focus is limited by means of the abutment 16. By exerting a pressure upon the knob 17 of a lever arm 19 carrying a latch 20 and controlled by a spring 18, the abutment 16 is disengaged from the latch 20 so as to allow an adjustment of the objective for short distances. It will be clear that the curves must be properly selected to suit the focal distance of the objectives used.

Behind the compartment 2 for the finder is arranged a compartment 21 for the shutter 22. The film band is located between the wall 23 and a pressure plate 24 and is wound from the spool 25 upon the spool 26 and is therebetween guided over a sprocket wheel 27 which is connected with the spool 26 by means of the gearing 28, 29, 30.

In the modified form of our device illustrated in Figure 5, objectives of varying focal distance may be used. As shown the objective stem 8 is provided with a plurality of regulator curves 31, 32, arranged to conform to the various focal distances.

In the form illustrated in Figure 6, the curves 31, 32, are arranged one behind the other at the rear end of the objective stem.

Another modification of our invention is illustrated in Figure 7 according to which the finder operating lever is coupled with a curve which is constantly in connection therewith for the regulation of the finder.

In order to bring the distances measured by the finder to correspond with the objective adjustment for the single focal distances, the objective frame is provided with an additional correction curve 33. The stem 8 of the objective frame has arranged thereon a curve 9 suited to the objective used for normal adjustments in the camera. It will be apparent that this curve cannot be a constant velocity curve but must be calculated or determined under observation of the following considerations: For the focusing upon a near object the known formula $$x.x_1 = f^2$$

is used in which $x_1$ represents the rotation or extension of the lens for focus upon objects in a finite distance in comparison to focusing upon objects in infinite distance. $x_2$ represents the distance between the focused object and the frontal focus of the objective. The following equation is valid for the regulation of a mirror basis distance meter upon the distance E:

$$\tang \alpha = \frac{b}{E}$$

in which E represents the distance of the object to be measured and b the base of the distance meter, as for instance shown in Figure 8. For small angles $\alpha$ is about equal to $$\frac{b}{E}$$

so that the resultant distance E is equal to b.

As the distance E represents the distance between the object and the base of the distance meter, while in the formula for the objective focusing $x$ represents the distance between the object and frontal focus of the object, a difference between the values $x$ and E is resultant, which becomes more noticeable if more and nearer objects are to be focused upon.

The curve used by us must therefore be calculated so as to result in a conformity between the above explained optical laws for the distance meter and the regulation of the objective, such that the curve is not a constant velocity curve but shows corresponding deviations from a linear value.

The objective frame is secured to the stem 8 by means of the bayonet lock 34. The curve 9 of the stem 8 guides the lever arm 5 upon which is arranged the movable mirror 3 of the finder which is built into the camera.

If objectives for other focal distances are to be used the objectives are simply exchanged for objectives having the desired for instance longer focal distance.

All objectives are provided with a correction curve 33 and are secured by means of the bayonet lock 34, while the objective is automatically coupled with the stem 8 by means of a resilient latch 35. During the adjustment of the finder also the inner part 36 of the exchanged objective is operated during the rotation of stem 8.

In part 36 a pin 37 is provided which engages the correction curve 33 of the objective frame 38 which by means of its threaded part 39 can be adjusted in axial direction. The normal objective which does not require a correction curve is secured by means of the bayonet lock 40 to the stem 8.

It will be understood that we have described and shown the preferred forms of our invention as examples only of the many possible ways to practically construct the same, and that we may make such changes in the general arrangement and in the construction of the minor details thereof as come within the scope of the appended claims, without departure from the spirit of our invention and the principles involved.

Having thus described our invention what we claim as new and desire to secure by Letters Patent is:

1. A camera including its objective having a stem, a stop on said stem, and an angular lever having a latch engaging said stop for limiting the focal distance of the objective.

2. A camera including its objective having a stem and a finder chamber, a stop on said stem, an angular lever extending through the top of said chamber and having a latch engaging said stop, a spring controlling said angular lever extending through the top of the finder chamber, and a knob for operating said angular lever.

3. In a camera including its objective and finder, a means for governing the finder adjustments, a stem for said objective, and regulator curves in successive order upon the rear end of the objective stem.

4. In a camera including its objective and finder, concentrically arranged cylindrical stems for said objective and regulator curves on said cylindrical stems.

5. A camera including its objective and finder comprising a regulator curve for the finder, and an additional curve on the objective frame co-operating with said regulator curve bringing the distances measured by the finder in accord with the optical adjustments for the varying focal distances.

6. A camera including its objective and finder comprising a regulator curve for the finder, and an additional curve on the frame of the objective and exchangeable therewith.

7. A camera including its objective and finder comprising a stem for said objective, a regulator curver therefor, an axially displaced cylinder and a latch engaged by said cylinder for coupling the exchangeable objective with said stem.

HEINZ KÜPPENBENDER.
MARTIN NOWICKI.
EMANUEL GOLDBERG.
ARTHUR MENDE.